(12) United States Patent
Houdek et al.

(10) Patent No.: US 12,105,295 B2
(45) Date of Patent: Oct. 1, 2024

(54) BALANCED HELMET MOUNTED VISUAL COMMUNICATION AND NAVIGATION SYSTEM

(71) Applicant: Qwake Technologies, Inc., San Francisco, CA (US)

(72) Inventors: Phil Houdek, San Jose, CA (US); Mike Ralston, Mountain View, CA (US); Omer Haciomeroglu, Austin, TX (US); Sam Cossman, Austin, TX (US)

(73) Assignee: Qwake Technologies, Inc., San Francisco, CA (US)

(*) Notice: Subject to any disclaimer, the term of this patent is extended or adjusted under 35 U.S.C. 154(b) by 0 days.

(21) Appl. No.: 18/371,500

(22) Filed: Sep. 22, 2023

(65) Prior Publication Data
US 2024/0103283 A1    Mar. 28, 2024

Related U.S. Application Data

(60) Provisional application No. 63/409,198, filed on Sep. 22, 2022.

(51) Int. Cl.
G02B 27/01    (2006.01)
(52) U.S. Cl.
CPC ................. *G02B 27/0176* (2013.01)
(58) Field of Classification Search
CPC .................................................. G02B 27/0176
See application file for complete search history.

(56) References Cited

U.S. PATENT DOCUMENTS

| | | | | |
|---|---|---|---|---|
| 5,683,831 | A * | 11/1997 | Baril ................. | G02B 27/0176 429/96 |
| 10,365,493 | B2 * | 7/2019 | Pombo ............... | G02B 27/0176 |
| 10,437,070 | B2 * | 10/2019 | Pombo ............... | G02B 27/0172 |
| 10,739,590 | B2 * | 8/2020 | Cummings .......... | H04N 13/344 |
| 10,774,987 | B2 * | 9/2020 | Xu ........................... | G06F 3/011 |
| 11,287,292 | B2 * | 3/2022 | Kitain ............... | G02B 27/0176 |
| 11,340,465 | B2 * | 5/2022 | Pombo ............... | G02B 27/0176 |
| 11,360,309 | B2 * | 6/2022 | Goupil ............... | G02B 27/0172 |
| 11,487,124 | B2 * | 11/2022 | Atac ...................... | G01C 21/10 |
| 11,668,944 | B2 * | 6/2023 | Parkinson .......... | G02B 27/0101 345/8 |

(Continued)

*Primary Examiner* — Vinh T Lam
(74) *Attorney, Agent, or Firm* — Marton Ribera Schumann & Chang LLP; Chien-Ju Alice Chuang

(57) ABSTRACT

The technology described herein relates to a balanced helmet mounted visual communication and navigation system. A helmet mounted visual communication and navigation system may include a vision module attachable to, and removable from, a front portion of a helmet by an attachment mechanism, a compute module attachable to, and removable from, a back portion of a helmet by another attachment mechanism, and a cable with an end for connecting to the vision module and another end for connecting to the compute module, the cable having a housing configured to house one or more wires. The vision module may include a sensor, a heads up display (HUD) combiner subassembly, and one or more user control buttons. The compute module may include an internal core subassembly with electronic and computing components for operation of the helmet mounted visual communication and navigation, a heat management element, and a power module.

21 Claims, 3 Drawing Sheets

(56) References Cited

U.S. PATENT DOCUMENTS

| | | | | |
|---|---|---|---|---|
| 11,686,946 B2* | 6/2023 | Boger | ................ | G02B 27/0176 |
| | | | | 359/630 |
| 11,796,822 B2* | 10/2023 | Denhez | .............. | G02B 27/0176 |
| 2012/0120482 A1* | 5/2012 | Hedges | .............. | G02B 27/0176 |
| | | | | 359/353 |
| 2014/0259317 A1* | 9/2014 | Bandy | ................ | G02B 27/0176 |
| | | | | 2/422 |
| 2020/0400274 A1* | 12/2020 | Xu | .......................... | G06F 3/011 |
| 2021/0059344 A1* | 3/2021 | Ralston | ................... | G06F 3/013 |
| 2021/0127774 A1* | 5/2021 | Schroder | ............ | G02B 27/0179 |
| 2021/0307442 A1* | 10/2021 | Yamada | ............... | H04N 9/3173 |
| 2022/0244549 A1* | 8/2022 | Yoshimura | ......... | G02B 27/0176 |
| 2022/0299782 A1* | 9/2022 | Ran | .................... | G02B 27/0176 |
| 2023/0096634 A1* | 3/2023 | Shih | ........................ | H01Q 1/42 |
| | | | | 343/700 R |
| 2023/0194881 A1* | 6/2023 | Tecchia | .................. | G06F 1/163 |
| | | | | 348/158 |
| 2023/0411830 A1* | 12/2023 | Lai | ........................ | H01Q 1/241 |
| 2024/0134207 A1* | 4/2024 | Zhang | ................ | G02B 27/0176 |

\* cited by examiner

BALANCED HELMET MOUNTED VISUAL COMMUNICATION AND NAVIGATION SYSTEM

CROSS-REFERENCE TO RELATED APPLICATIONS

This application claims priority to U.S. Provisional Patent Application No. 63/409,198 entitled "Balanced Helmet Mounted Navigation and Communications System," filed Sep. 22, 2022, the contents of which are hereby incorporated by reference in their entirety.

FIELD OF INVENTION

The present invention relates to fire fighting, military, and safety gear. More particularly, the invention is directed to a wearable helmet mounted visual communication and navigation system.

BACKGROUND OF INVENTION

Fire fighting, life safety situations, military, law enforcement, emergency rescues, public safety and other missions and exercises frequently create a need for emergency response personnel and other critical workers to be able to see in the dark and through smoke. In such situations, navigation and communications gear that can provide emergency response personnel with more information to safely and quickly operate is essential. Conventional solutions include handheld thermal cameras, handheld radios, shoulder microphones, face mask mounted microphones and radios, flashlights, and physical tags. However, handheld implementations are cumbersome in emergency situations, and occupy hands that are needed for other tasks. Handheld implementations also often operate at a relatively larger distance from a user's eye, which increases the likelihood that smoke will obscure the visual path between the user's and the display screen.

Problems with existing solutions for mounting thermal cameras, or other navigation and communications gear, onto a user's wearable safety helmet or other wearable safety gear (i.e., onto a part of a uniform or other body-worn gear) includes unevenly weighing down a front or side of helmets and uniforms, snag hazards, and, when mounted onto other wearable safety gear, lack of ability to track a user's head motion.

Therefore, a balanced helmet mounted (i.e., hands free) visual communication and navigation system is desirable.

BRIEF SUMMARY

The present disclosure provides for techniques relating to a balanced helmet mounted visual communication and navigation system. A helmet mounted visual communication and navigation system may include: a vision module removably coupled to a front portion of a helmet by a first attachment, the vision module comprising a sensor, a heads up display (HUD) combiner subassembly, and one or more user control buttons; a compute module removably coupled to a back portion of the helmet by a second attachment, the compute module comprising an internal core subassembly including at least some of the electronics for operation of the helmet mounted visual communication and navigation, a heat management element, and a power module; and a cable removably coupled to the vision module and the compute module, the cable comprising a housing configured to house one or more wires.

In some examples, the first attachment comprises a first mating feature on a first side and a second mating feature on a second side. In some examples, the first mating feature is configured to couple to a brim of the helmet. In some examples, the first mating feature comprises a side contoured to fit a brim surface of the helmet. In some examples, the second mating feature is configured to couple to the vision module. In some examples, the second attachment comprises a helmet-facing side configured to couple to the back portion of the helmet and a module-facing side configured to couple to the compute module. In some examples, the helmet-facing side is contoured to fit an inner helmet surface of the back portion of the helmet and the module-facing side is contoured to fit a compute module surface. In some examples, the second attachment may be selected from a plurality of second attachment types, each of the plurality of second attachment types comprising a different inner helmet surface configured to couple to a different type of helmet. In some examples, the vision module and the compute module are each shaped and sized to minimize the helmet's moment of inertia, thereby reducing a user's perceived mass of the system. In some examples, the compute module is shaped to fit within an unused space between the helmet's inner surface and a user's head when the helmet is being worn on the user's head. In some examples, the vision module and the compute module are configured to implement a cognitive load reducing platform comprising a cognitive enhancement engine. In some examples, the vision module also includes a pointing laser.

In some examples, the housing is shaped to approximately conform to a side contour of the helmet such that the housing does not jut out from the side of the helmet. In some examples, the one or more wires comprises one or both of an electrical wire and a light cable. In some examples, the one or more wires comprises one, or a combination, of a coaxial cable, a fiber optic cable, a data cable, an ethernet cable, a twisted wire pair, an audio cable, an HDMI cable, a VGA cable, and an other video cable. In some examples, the cable comprises a first connector end configured to connect physically and electrically to a corresponding vision module connector. In some examples, the cable comprises a second connector end configured to connect physically and electrically to a corresponding compute module connector. In some examples, the housing comprises a heat resistant material. In some examples, the cable comprises a thermal protective feature. In some examples, the thermal protective feature comprises insulation. In some examples, the housing comprises a flexible material.

BRIEF DESCRIPTION OF THE DRAWINGS

Various non-limiting and non-exhaustive aspects and features of the present disclosure are described hereinbelow with references to the drawings, wherein.

Figure 1A:
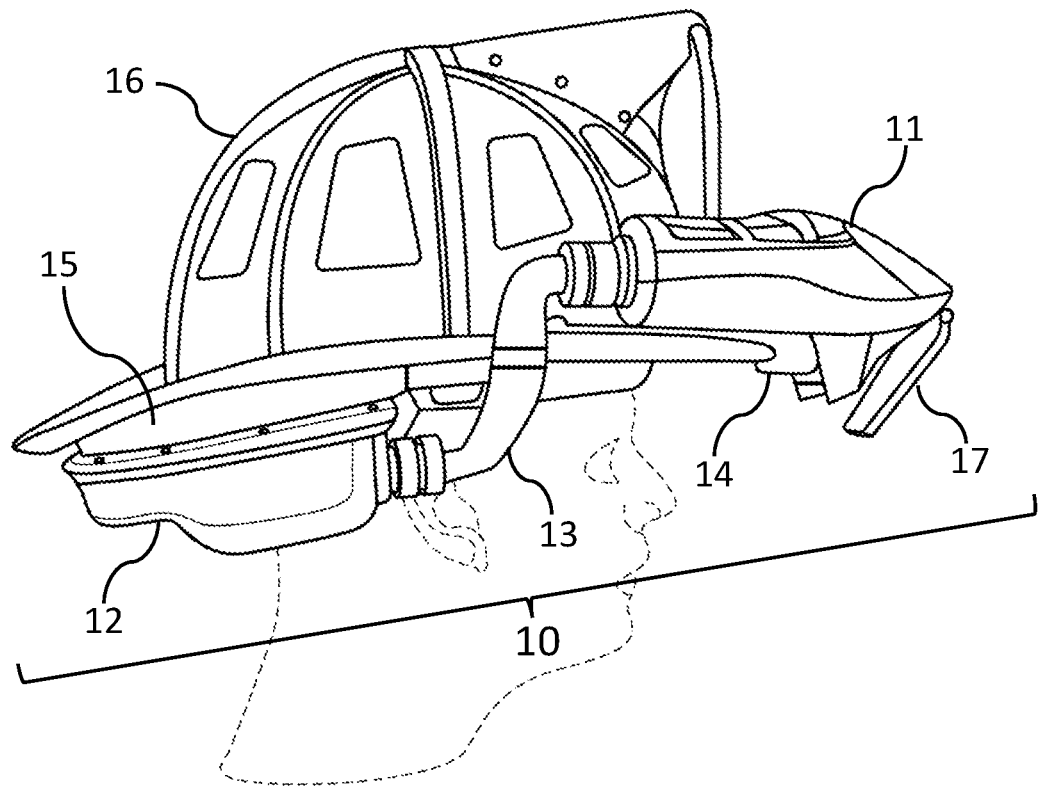
FIGS. 1A-1B are a side and a perspective view of an exemplary helmet with a balanced helmet mounted visual communication and navigation system, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a balanced helmet mounted (i.e., hands free) visual communication and navigation system. A helmet mounted visual communication and navigation system may include a vision module coupled to a front portion (e.g., a front surface) of a helmet, a compute module coupled to a rear (i.e., back) surface of the helmet, a cable that connects the vision module and the compute module, a first attachment element configured to removably couple the vision module to the helmet, a second attachment element configured to removably couple the compute module to the helmet. The vision and compute modules may provide navigation functions (e.g., using lights, laser, camera, heads up display (HUD), navigation user interface, processing and compute for control thereof) for the balanced helmet mounted visual communication and navigation system. The vision and compute modules also may provide communication functions (e.g., using lights, laser, user control buttons). The first attachment element may comprise mating features to the helmet's contours on a first side and to the vision module on a second side. The second attachment element may comprise mating features to the helmet's contours on a first side and to the compute module on a second side. The first and second attachment elements allow the vision module and compute module, respectively, to be attached to, and detached from, the helmet. In some examples, the vision module and compute module may be coupled to various different (e.g., varying designs) and unique (e.g., separate, user-specific) helmets. For example, the shape, pattern, number of adhesive mount pads, and other configurations, on a helmet-facing portion of a compute module attachment may be varied to match different types of helmets, while keeping shape and coupling elements of a compute module-facing portion of a compute module attachment matching that of a given compute module. For example, the module-facing side of a second attachment may be contoured to fit a compute module surface, this module-facing contour may be maintained across different types of helmets, while the helmet-facing side may be contoured to fit an inner helmet surface of the back portion of a helmet and may be varied across different types of helmets. This modular design allows for a given compute module to be removably coupled to different types of helmets. Similarly, the shape, pattern, helmet-coupling elements, and other configurations, on a helmet-facing portion of a vision module attachment may be varied to match different types of helmets, while keeping shape and coupling elements of a vision module-facing portion of a vision module attachment matching that of a given vision module. This modular design allows for a given compute module to be removably coupled to different types of helmets.

A visual communication and navigation system may be coupled to parts of a safety helmet and may comprise built-in thermal camera and other sensors, a HUD to view enhanced visual information comprising both raw and processed sensor data from said thermal camera and other sensors. The thermal camera and other sensors may include situational awareness sensors (e.g., cameras (e.g., a thermal imaging camera (TIC), a radiometric thermal camera, a drone camera), a spectrometer, a photosensor, a magnetometer, a seismometer, a gas detector, a chemical sensor, a radiological sensor, a voltage detector, a flow sensor, a scale, a thermometer, a pressure sensor, an acoustic sensor (e.g., selective active noise cancellation to facilitate radio communication), an inertial measurement unit, a GPS sensor, a speedometer, a pedometer, an accelerometer, an altimeter, a barometer, an attitude indicator, a depth gauge, a compass (e.g., fluxgate compass), a gyroscope, and the like) and biometric sensors to measure (e.g., monitor) health conditions and status of a user (e.g., a heart rate sensor, a blood pressure monitor, a glucose sensor, an electrocardiogram (e.g., EKG or ECG) sensor, an electroencephalogram (EEG) sensor, an electromyography (EMG) sensor, a respiration sensor, a neurological sensor, and the like). In some examples, the visual communication and navigation system also may include a pointing laser (e.g., to help a user navigate, as well as a visual indication to other personnel of the user's presence and approximate location) and other tools.

The visual communication and navigation system may be helmet mounted such that the visual and other sensors can track a user's head motion and approximates where the user is looking so that the HUD may include the user's current point of view. For example, the HUD may be configured to display a representation of a user's environment from the user's point of view. The HUD display may face the user within the user's field of vision. Such a helmet mounted system also reduces snag hazard and allows for integration with streamlined emergency personnel and critical worker procedures and workflows.

The visual communication and navigation system may comprise two or more modules to be coupled at different locations on a helmet, the two or more modules configured to minimize the added moment of inertia to reduce a user's perceived mass of the system. The two or more modules may be strategically placed to wrap around inner and outer surfaces of a helmet largely using available, unused space within and around a helmet. The two or more modules may be configured to implement a cognitive load reducing platform comprising a plurality of sensors, a compute subassembly (e.g., processor, memory) configured to execute a cognitive enhancement engine (e.g., software-based engine configured to process sensor data into enhanced characterization data configured to provide contextual and physiological visual, auditory, and/or haptic cues and information), and an output device (e.g., HUD, other visual display, headphones, earbuds, other auditory output devices, haptic device, and the like).

The two or more modules may include a vision module comprising a heads up display (HUD) combiner subassembly, one or more user control buttons, a laser, an indicator light, a camera and other sensors, and a cable connection interface, or a sub-combination thereof, as described in more detail herein. The two or more modules also may include a compute module comprising at an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

In some examples, the visual communication and navigation system may include thermal protection features to protect electronic parts and systems, including heat resistant materials, insulation, heat reservoirs (e.g., heatsinks comprising phase change material to store heat dissipated from electronic parts and systems), heat spreaders, and the like.

Figure 1B:
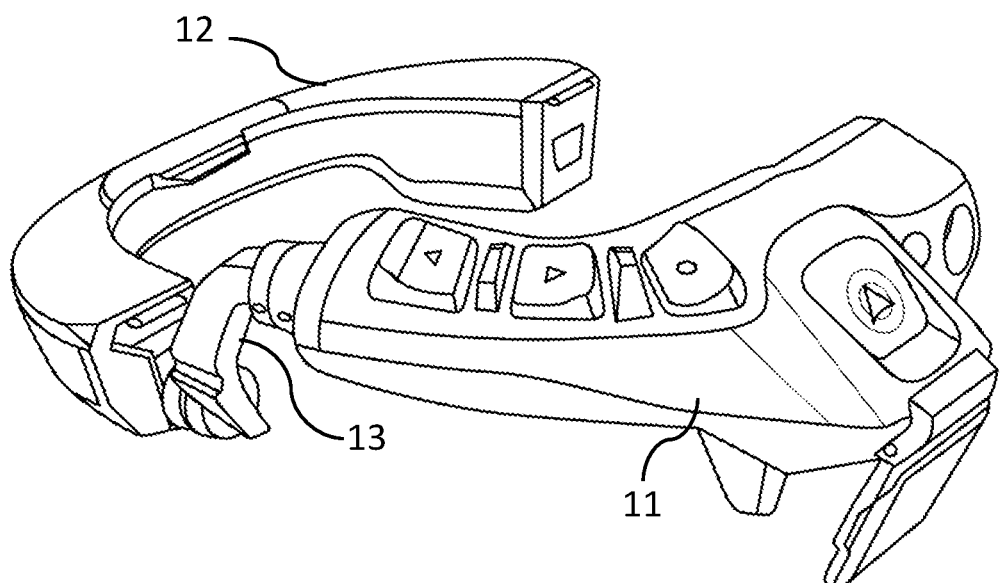

FIGS. 1A-1B are a side and a perspective view of an exemplary helmet with a balanced helmet mounted visual communication and navigation system, in accordance with one or more embodiments. A visual communication and navigation system 10 may be removably coupled (e.g., attached and detached using attachments 14-15) to helmet 16. Vision module 11 and compute module 12 are shown connected using cable 13 (e.g., comprising a system cable, a data cable, and/or other cables and wires). In some examples, vision module 11 attaches and detaches to vision module attachment 14 without tools, and compute module 12 similarly attaches and detaches to compute module attachment 15 without tools. Vision module attachment 14 and compute module attachment 15 may be more permanently coupled (e.g., adhesively bonded, mechanically attached) to helmet 16. In some examples, vision module attachment 14 may be coupled to a top surface of a front brim of helmet 16, as shown. In some examples, compute module attachment 15 may be coupled to a bottom surface of a back portion (e.g., brim) of helmet 16, as shown. Vision module 11 may include heads up display (HUD) combiner subassembly 17, which is shown in a partially open position (e.g., a position wherein the display is viewable by a user). As shown in FIG. 1B, a HUD may flip down into an open position to occupy a portion of a user's field of view. Said HUD may flip up into a closed position when not in use. In some examples, the HUD may be formed using materials able to withstand high heat, smoke-filled, and other extreme conditions. In some examples, the HUD may comprise a plurality of layers, including a world facing shell, a glass or plastic mirror or partial mirror, and a user facing shell, the world facing shell and user facing shell bonded, or otherwise secured, along their perimeter edge to create a sealed volume enclosing the mirror within. In some examples, the world facing shell and user facing shell may comprise a largely clear material configured to enable viewing of the glass display (e.g., a combiner glass configured to display a graphical user interface) and may be coated with hydrophilic material to minimize fogging and optical distortion from moisture (e.g., encourage water sheeting). In some examples, the world facing shell and user facing shell also may be treated with a coating, or may comprise a material, that is heat and/or debris resistant.

In some examples, vision module 11 may comprise a HUD combiner subassembly, one or more user control buttons, a laser, an indicator light, a camera and other sensors, and a cable connection interface, or a sub-combination thereof, as described in more detail herein. In some examples, compute module 12 may comprise an internal core subassembly including least some of the electronics for operation of the visual communication and navigation system (e.g., a circuit board assembly (e.g., CPU, other PCB or processing unit), memory, an antenna, other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

Visual communication and navigation system 10 may comprise a thermal protection system including heat resistant materials, insulation, heat reservoirs (e.g., heat sinks comprising phase change material configured to store heat dissipated from electronic parts and systems), heat spreaders, as described herein.

Figure 2:
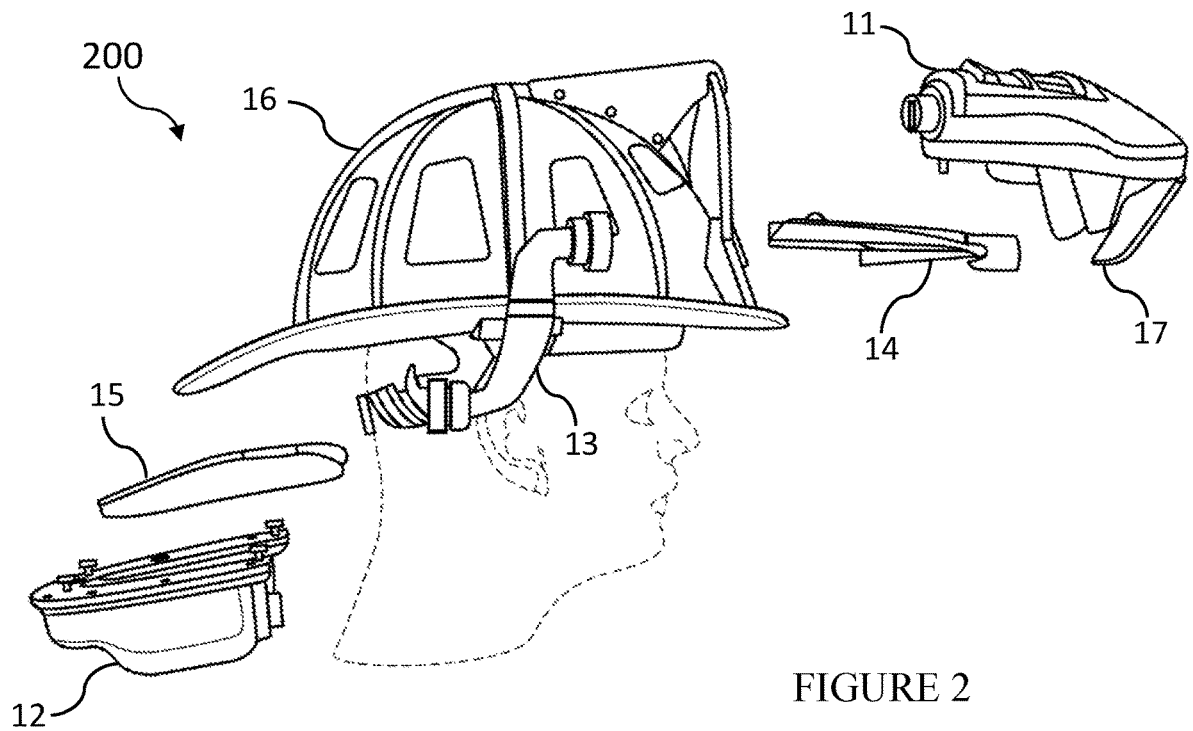
FIG. 2 is an exploded view of an exemplary helmet with a balanced helmet mounted visual communication and navigation system, in accordance with one or more embodiments.

FIG. 2 is an exploded view of an exemplary helmet with a balanced helmet mounted visual communication and navigation system, in accordance with one or more embodiments. All like-numbered elements in FIG. 2 are the same or similar to their corresponding elements in other figures. View 200 includes the same or similar vision module 11, compute module 12, cable 13, vision module attachment 14, compute module attachment 15, and helmet 16. In some examples, cable 13 may have one end removably coupled to vision module 11 and another end removably coupled to compute module 12. In some examples, cable 13 may comprise a housing, one or more electrical wires and/or light cables (e.g., coaxial, fiber optic, data, ethernet, twisted wire pairs, audio, HDMI, VGA, other video, and the like) housed (e.g., encased) within the housing, and two or more connector ends, each configured to physically, electrically, and communicatively connect to a module (e.g., vision module 11, compute module 12, and the like). In some examples, cable 13's housing may comprise heat resistant material. In some examples, cable 13's housing also may include insulation or other thermal protective features to protect electrical and/or light cables housed within from overheating. In other examples, cable 13's housing may be provided with a shape configured to approximately conform to a side contour of helmet 16 such that cable 13's housing does not jut out from helmet 16, thereby avoiding being a snag hazard (e.g., opportunity for snagging on other objects and surfaces with which the helmet, cable, and other parts of the helmet mounted visual communication and navigation system may contact). For example, as shown, said housing may be flatter left to right with a slight curve (e.g., a C-curve) so that one end connects with vision module 11 at least partly over the brim of helmet 16 and another end connects with compute module 12 at least partly under the brim of helmet 16. Also, as shown, said housing may be wider front to back to accommodate the volume of multiple cables and/or allow for cable angles due to tension or stiffness of materials. In some examples, said housing may have a slight double curve (e.g., an S-curve) in one dimension to reach corresponding connectors on two or more various modules. In other examples, cable 13's housing may comprise a flexible material able to take on any shape necessary to connect two or more modules and house any necessary electrical and light cables. In some examples, each end of cable 13 may comprise an interface for removably coupling to a corresponding connector on a module, mechanically (e.g., screwing or popping on and off) and electrically (e.g., male-female electrical, data, audio interfaces).

Figure 3:
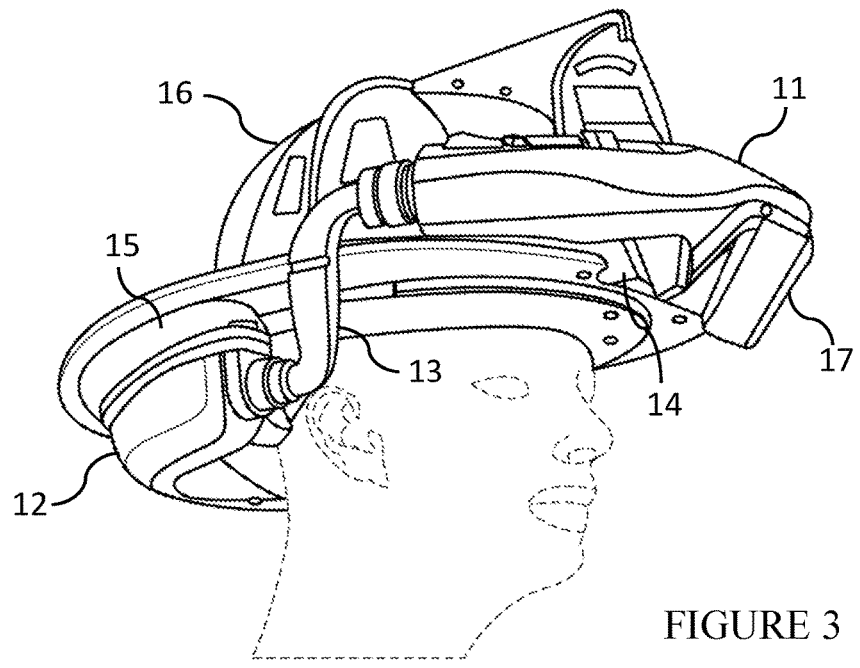
FIG. 3 is a perspective view of an exemplary helmet with a balanced helmet mounted visual communication and navigation system, in accordance with one or more embodiments.

FIG. 3 is a perspective view of an exemplary helmet with a balanced helmet mounted visual communication and navigation system, in accordance with one or more embodiments. All like-numbered elements in FIG. 3 are the same or similar to their corresponding elements in other figures.

Figure 4:
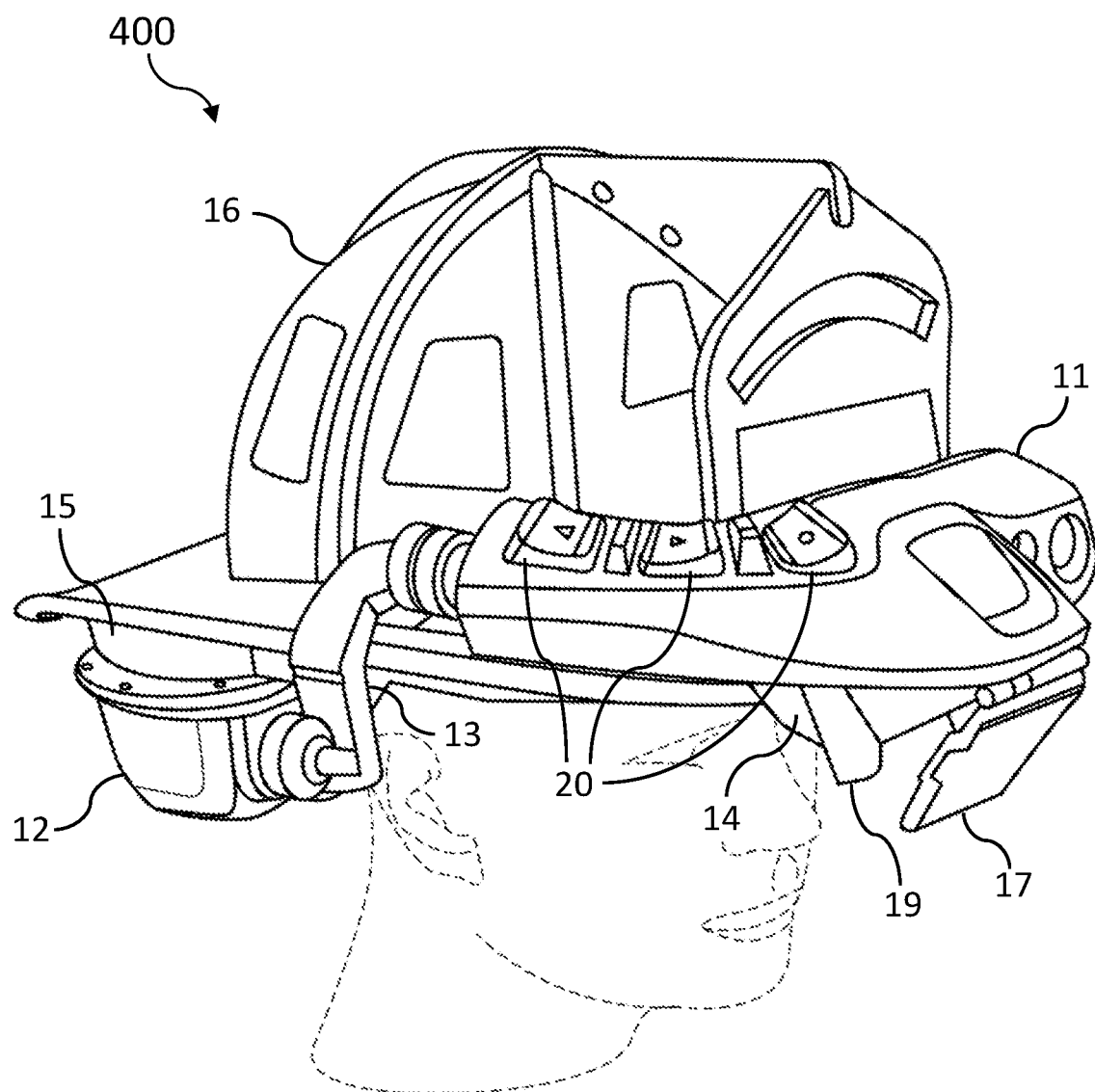
FIG. 4 is another perspective view of an exemplary helmet with a balanced helmet mounted visual communication and navigation system, in accordance with one or more embodiments.

FIG. 4 is another perspective view of an exemplary helmet with a balanced helmet mounted visual communication and navigation system, in accordance with one or more embodiments. All like-numbered elements in FIG. 4 are the same or similar to their corresponding elements in other figures. View 400 provides a top down perspective view that further shows an aperture 18, bumper(s) 19, and user control button(s) 20. In some examples, aperture 18 may be configured to provide an opening through which a thermal camera or other sensor may receive light and other sensory input. In some examples, aperture 18 may be covered with glass (e.g., germanium glass) or other material able to pass infrared light, for example, while providing an enclosure to maintain an ingress protected seal. In some examples, additional apertures may be provided on vision module 11 (e.g., for additional sensors, a laser, and the like).

In some examples, one or more bumper(s) 19 may be provided, for example, protruding down on either side of the HUD combiner subassembly 17 to protect the HUD combiner subassembly 17 from damage (e.g., from flying or falling debris, contact with obstacles, impact from normal wear and tear, and other impact from contact with surfaces and objects). In some examples, bumper(s) 19 may comprise elastomeric material.

In some examples, user control buttons 20 may control elements of a visual communications system, including one, or a combination, of a laser, lights (e.g., a rear communication (e.g., tail or brake) light facing backward on compute module 12, other lights on any module coupled to helmet 16 and/or coupled using cable 13), and any other visual communication unit or element on a helmet mounted visual communication and navigation system.

A person of ordinary skill in the art will recognize that the systems described herein may be implemented on various types of protective headgear used by emergency response personnel and critical workers for any type of emergency response, military, law enforcement, public safety, and other similar efforts and missions.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A helmet mounted visual communication and navigation system, comprising:
   a vision module removably coupled to a front portion of a helmet by a first attachment, the vision module comprising a sensor, a heads up display (HUD) combiner subassembly, and one or more user control buttons;
   a compute module removably coupled to a back portion of the helmet by a second attachment, the compute module comprising an internal core subassembly including at least some of the electronics for operation of the helmet mounted visual communication and navigation, a heat management element, and a power module; and
   a cable removably coupled to the vision module and the compute module, the cable comprising a housing configured to house one or more wires.

2. The system of claim 1, wherein the first attachment comprises a first mating feature on a first side and a second mating feature on a second side.

3. The system of claim 2, wherein the first mating feature is configured to couple to a brim of the helmet.

4. The system of claim 2, wherein the first mating feature comprises a side contoured to fit a brim surface of the helmet.

5. The system of claim 2, wherein the second mating feature is configured to couple to the vision module.

6. The system of claim 1, wherein the second attachment comprises a helmet-facing side configured to couple to the back portion of the helmet and a module-facing side configured to couple to the compute module.

7. The system of claim 6, wherein the helmet-facing side is contoured to fit an inner helmet surface of the back portion of the helmet and the module-facing side is contoured to fit a compute module surface.

8. The system of claim 1, wherein the second attachment may be selected from a plurality of second attachment types, each of the plurality of second attachment types comprising a different inner helmet surface configured to couple to a different type of helmet.

9. The system of claim 1, wherein the vision module and the compute module are each shaped and sized to minimize the helmet's moment of inertia, thereby reducing a user's perceived mass of the system.

10. The system of claim 1, wherein the compute module is shaped to fit within an unused space between the helmet's inner surface and a user's head when the helmet is being worn on the user's head.

11. The system of claim 1, wherein the vision module and the compute module are configured to implement a cognitive load reducing platform comprising a cognitive enhancement engine.

12. The system of claim 1, wherein the vision module further comprises a pointing laser.

13. The system of claim 1, wherein the housing is shaped to approximately conform to a side contour of the helmet such that the housing does not jut out from the side of the helmet.

14. The system of claim 1, wherein the one or more wires comprises one or both of an electrical wire and a light cable.

15. The system of claim 1, wherein the one or more wires comprises one, or a combination, of a coaxial cable, a fiber optic cable, a data cable, an ethernet cable, a twisted wire pair, an audio cable, an HDMI cable, a VGA cable, and an other video cable.

16. The system of claim 1, wherein the cable comprises a first connector end configured to connect physically and electrically to a corresponding vision module connector.

17. The system of claim 1, wherein the cable comprises a second connector end configured to connect physically and electrically to a corresponding compute module connector.

18. The system of claim 1, wherein the housing comprises a heat resistant material.

19. The system of claim 1, wherein the cable comprises a thermal protective feature.

20. The system of claim 19, wherein the thermal protective feature comprises insulation.

21. The system of claim 1, wherein the housing comprises a flexible material.

\* \* \* \* \*